United States Patent Office 3,558,571
Patented Jan. 26, 1971

3,558,571
PROCESS OF PREPARING AROMATIC POLYAMIDES BY SOLID PHASE THERMAL POLYMERIZATION OF UREA AND URETHANE DERIVATIVES OF AROMATIC AMINO ACIDS
Roe C. Blume, Highland Woods, Wilmington, Del., assignor to E. I. du Pont de Nemours and Company, Wilmington, Del., a corporation of Delaware
No Drawing. Filed May 15, 1969, Ser. No. 825,040
Int. Cl. C08g 20/32
U.S. Cl. 260—78                          4 Claims

ABSTRACT OF THE DISCLOSURE

High molecular weight all-aromatic polyamides are prepared in a solid phase thermal polymerization of urethane and urea derivatives of aromatic amino acids. The resultant polymer is useful in the formation of shaped articles (e.g., fibers).

---

This invention relates generally to the preparation of polyamides and more particularly to the preparation of polyamides from specified derivatives of aromatic amino acids.

BACKGROUND OF THE INVENTION

It is known that polymers of aromatic amino acids can be obtained by reacting the acyl chloride-amine hydrochloride derivative of the acid in solution at temperatures below about 25° C. However, it has been found difficult to prepare these monomers in the absence of by-products, including unreacted acid, which may act as polymerization inhibitors.

Although the free amino acid can be polymerized, temperatures of about 225° C. are required to obtain a useful rate of reaction. At this temperature, a substantial amount of decarboxylation occurs, and the amine rather than the polymer is often the major product even when known polymerization catalysts, e.g., phosphoric acid, are employed.

Aliphatic polyamides have been produced from aliphatic urethane carboxylic acids by a melt polymerization process. However, this process is not suitable for use in the formation of polymers which undergo substantial decomposition when heated at temperatures above their melting point.

SUMMARY OF THE INVENTION

This invention involves a method for preparing high molecular weight all-aromatic polyamides by solid phase polymerization. The process comprises heating at least one compound corresponding to the formula:

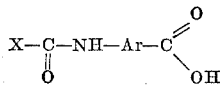

wherein Ar represents a divalent aromatic hydrocarbon radical having chain-extending bonds located in either a meta or para position and X represents a monovalent radical selected from the group consisting of —OR, —NHR, and —NR$_2$, in which R represents a saturated aliphatic hydrocarbon radical containing one to five carbon atoms, inclusive, or a saturated cycloaliphatic hydrocarbon radical containing 5 or 6 carbon atoms. The aromatic radical may contain one or more substituents which do not take part in the polymerization reaction.

The heating of the compound should be at a temperature of at least 190° C. for a sufficient time and at a sufficient temperature to polymerize the compound, volatilize by-products and form a useful product with an inherent viscosity of at least 0.4, measured as described hereinafter.

DESCRIPTION OF PREFERRED EMBODIMENTS

Monomers

The monomeric compounds suitable for use in this invention are characterized by the general formula set out in the above summary of the invention, in which Ar and X have the significance as stated therein. The formula corresponds to urethane and urea derivatives of aromatic amino acids. It is preferred that Ar be p-phenylene, although other divalent aromatic hydrocarbon radicals such as naphthalene and 4,4'-biphenylene are also suitable. Two or more of the monomeric compounds may be simultaneously heated, e.g., to form a copolyamide.

The urethane derivatives (i.e., when X is OR) are conveniently prepared by reacting an aromatic amino acid with chloroformates, which in turn may be prepared by reacting an alcohol with phosgene. The reaction between chloroformate and amino acid is preferably carried out in the presence of an alkali metal hydroxide or a salt thereof, the preferred compounds being sodium carbonate and sodium hydroxide. The free acid is obtained by treatment of the reaction mixture with a mineral acid, preferably hydrochloric acid, to obtain a pH of about 3.

Urea derivatives (i.e., when X is NHR or NR$_2$) of aromatic amino acids can be obtained by reacting the amino acid with stoichiometric equivalents of phosgene and a primary or secondary amine, e.g., diisopropyl amine, successively and in that order.

Polymerization

The heating of the urea- and urethane-acid compounds of this invention results in a solid phase polymerization. The compound remains in the solid phase essentially throughout the course of the reaction. During the initial stage of the reaction, an isocyanate is formed and either an alcohol (ROH) or an amine (RNH$_2$ or R$_2$NH) is formed as a by-product. Then during the polymerization of the polyamide, carbon dioxide is formed as a by-product. The temperatures employed for the polymerization should be above the boiling point of the by-products to assure that these compounds will not interfere with the polymerization reaction.

The polymerization of the present urethane- or urea-acids should be carried out under anhydrous conditions and an inert atmosphere to obtain a high molecular weight polymer. The reaction vessel, auxiliary equipment and reactants are carefully dried prior to use and the reaction vessel is preferably continuously swept with a stream of dry inert gas, e.g., nitrogen, during the polymerization.

The urethane- or urea-acid should be heated above 190° C. for a sufficient time and at a sufficient temperature to produce a useful polymer which exhibits an inherent viscosity of at least 0.4, measured at 30° C. using a solution containing 0.5 g. of the polymer per 100 cc. of concentrated (95–98% by weight) aqueous sulfuric acid. It may be preferable, however, to form the high molecular weight polyamide by a two-step process. This would involve first a preheating of the urethane- or urea-acid at temperatures between 190 and 250° C. for periods between 0.5 and 24 hours in order to volatilize the amine or alcohol by-product and form a prepolymer. Secondly, there is a post-heating of the prepolymer at temperatures between 300 and 450° C., preferably between 360 and 420° C., for periods between 0.1 and 3 hours until the product exhibits an inherent viscosity of at least 0.4, measured as hereinbefore described. In order to facilitate the second stage of polymerization, the prepolymer may be ground or comminuted to a particle size small enough to permit substantially all of the particles to pass through a 20-mesh screen of the Tyler series. At no time should the temperature be permitted to exceed the melting point of the polymerizing compound.

The resultant polymer is useful, e.g., in the preparation of fibers, films, and fibrids, generally by solution shaping (e.g., spinning) techniques. Generally, the inherent viscosity of at least 0.7 (preferably above 1.0) is necessary for high strength fibers. However, lower values are often suitable for films and even lower values as low as about 0.4 are suitable for fibrids (e.g., by the shear-precipitation techniques described in Morgan U.S. 2,999,788). If the inherent viscosity of the polymer at a given stage of heating is too low (although above 0.4) for a particular end-use, continued heating generally increases the viscosity (e.g., see the tabular results in Example I).

Solutions of the present polymers in sulfuric acid (preferably concentrated to 95–100%), oleum (i.e., sulfuric acid containing up to 20% or higher of free $SO_3$), hydrofluoric acid, or other suitable solvents can be extruded or cast using conventional techniques to form fibers and films.

The following examples demonstrate the preparation of high molecular weight polyamides using the process of this invention. In these examples all parts and percentages are expressed on a weight basis, unless otherwise indicated.

Inherent viscosities ($\eta_{inh}$) are determined in accordance with the following equation:

$$\eta_{inh} = \frac{\ln \eta_{rel}}{C}$$

The relative viscosity ($\eta_{rel}$) is determined by dividing the flow time in a capillary viscometer of a dilute solution of the polymer by the flow time for the pure solvent. The concentration (C) used in 0.5 gram of polymer per 100 cc. of concentrated (95–98% by weight) aqueous sulfuric acid solution and the temperature is 30° C.

EXAMPLES

Example I

A solution comprising 137 parts p-aminobenzoic acid and 500 parts ethanol is cooled to 10° C. and treated dropwise with 47.25 parts methyl chloroformate. Then the addition of 53 parts $Na_2CO_3$ in 250 parts water is begun and carried out concurrently with the addition of 47.25 parts methyl chloroformate. The reaction mixture is neutralized to a pH of 3 by using a 1 N aqueous solution of hydrochloric acid. The resultant solid precipitate is filtered, washed with water, and recrystallized from ethanol to yield a product exhibiting a melting point of 203° C. The calculated analysis for $C_9H_9NO_4$ is: C=55.38; H=4.65; N=7.18; O=32.79. The actual analysis is: C=55.32; H=4.94; N=6.74; O=32.87. This compound is a urethane-acid which corresponds to the formula heretofore stated wherein Ar is p-phenylene, X is OR and R is methyl.

This compound is then preheated under nitrogen at 200–210° C. for 2 hours, cooled and ground fine in a mortar. Samples of the resultant prepolymer are postheated at 400° C. under nitrogen with the following results:

| Time (min.): | $\eta_{inh}$ |
| --- | --- |
| 1 | 0.12 |
| 2.8 | 0.26 |
| 5 | 0.57 |
| 10 | 0.93 |
| 20 | 1.45 |
| 40 | 2.26 |

Example II

A solution comprising 13.7 parts p-aminobenzoic acid in 200 parts ethyl acetate is added dropwise to 200 parts of refluxing ethyl acetate into which phosgene is bubbled at such a rate that the solution remains substantially clear. At the end of the addition the solution is treated with a volume of hexane sufficient to precipitate p-carboxycarbanyl chloride. This product is redissolved in fresh ethyl acetate and treated with 20 parts of diisopropyl amine. The precipitate which forms is filtered off and dissolved in water. The resultant solution is acidified as described in Example I. The resultant precipitate is isolated and exhbits a melting point of 178° C. The calculated analysis for $C_{14}H_{20}N_2O_3$ is: C=63.61; H=7.63; N=10.60; O=18.16. The actual analysis is found to be: C=65.4; H=7.5; N=10.4; O=18.3. This compound is a urea-acid which corresponds to the formula heretofore stated wherein Ar is p-phenylene, X is $NR_2$ and R is isopropyl.

Heating this urea-acid at 300° C. under nitrogen for 1 hour results in a 93% yield of polymer, $\eta_{inh}=0.46$.

What is claimed is:

1. A process for preparing aromatic polyamides, comprising heating at least one compound corresponding to the formula

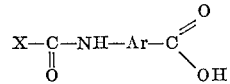

wherein Ar represents a divalent aromatic hydrocarbon radical having chain-extending bonds located in either a meta or para position and X represents a monovalent radical selected from the group consisting of —OR, —NHR, and —$NR_2$, in which R represents a saturated aliphatic hydrocarbon radical containing one to five carbon atoms, inclusive, or a saturated cycloaliphatic hydrocarbon radical containing 5 or 6 carbon atoms at a temperature of at least 190° C. for a sufficient time and at a sufficient temperature to volatilize by-products and form a product with an inherent viscosity of at least 0.4, measured at 30° C. using a solution containing 0.5 g. of the polymer per 100 cc. of concentrated (95–98% by weight) aqueous sulfuric acid.

2. The process recited in claim 1 wherein said heating comprises a preheating of said compound at temperatures between 190° and 250° C. for periods between 0.5 and 24 hours in order to form a prepolymer, and a postheating of the preheated compound at temperatures between 300 and 450° C. for periods between 0.1 and 3 hours.

3. The process recited in claim 2 in which the preheating and postheating steps are carried out under anhydrous conditions and an inert atmosphere.

4. The process recited in claim 1 in which Ar represents p-phenylene.

References Cited

UNITED STATES PATENTS

| 2,688,011 | 8/1954 | Wheatley et al. | 260—78 |
| 2,831,831 | 4/1958 | Caldwell et al. | 260—47 |

FOREIGN PATENTS 753,158  8/1952  Germany.

WILLIAM H. SHORT, Primary Examiner

H. SCHAIN, Assistant Examiner

U.S. Cl. X.R.

264—176